United States Patent
Tsukatani et al.

(10) Patent No.: US 12,039,736 B2
(45) Date of Patent: Jul. 16, 2024

(54) IMAGE PROCESSING DEVICE, METHOD, AND PROGRAM

(71) Applicant: NIPPON TELEGRAPH AND TELEPHONE CORPORATION, Tokyo (JP)

(72) Inventors: Shunsuke Tsukatani, Tokyo (JP); Kazuhiko Murasaki, Tokyo (JP); Shingo Ando, Tokyo (JP); Atsushi Sagata, Tokyo (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 505 days.

(21) Appl. No.: 17/413,429

(22) PCT Filed: Dec. 9, 2019

(86) PCT No.: PCT/JP2019/048008
§ 371 (c)(1),
(2) Date: Jun. 11, 2021

(87) PCT Pub. No.: WO2020/121996
PCT Pub. Date: Jun. 18, 2020

(65) Prior Publication Data
US 2022/0058807 A1 Feb. 24, 2022

(30) Foreign Application Priority Data
Dec. 13, 2018 (JP) .................. 2018-233709

(51) Int. Cl.
*G06N 3/0464* (2023.01)
*G06F 18/214* (2023.01)
(Continued)

(52) U.S. Cl.
CPC ............ *G06T 7/174* (2017.01); *G06F 18/214* (2023.01); *G06T 5/50* (2013.01); *G06T 2207/20081* (2013.01)

(58) Field of Classification Search
None
See application file for complete search history.

(56) References Cited

U.S. PATENT DOCUMENTS

2018/0089505 A1* 3/2018 El-Khamy ............ H01L 27/146
2019/0370984 A1* 12/2019 Tsai ........................ G06T 7/254

OTHER PUBLICATIONS

Liu, Yan, et al. "Efficient patch-wise semantic segmentation for large-scale remote sensing images." Sensors 18.10 (2018): 3232. (Year: 2018).*

(Continued)

*Primary Examiner* — Sean M Conner (57) ABSTRACT

Labels can be accurately identified even for an image with a resolution not used in training data. Based on an input image, a resolution of the input image, and a resolution of a training image used for training a trained model of assigning labels to pixels of an image, a plurality of low-resolution images are generated from the input image by using a plurality of shift amounts for a pixel correspondence between the input image and the respective low-resolution images with a resolution corresponding to the training image, the low-resolution images are input to the trained model, a plurality of low-resolution label images is output in which pixels of the respective low-resolution images are assigned labels, and a label image is output in which labels for pixels of the input image are obtained, based on the shift amounts used for generating the low-resolution images and the low-resolution label images.

15 Claims, 6 Drawing Sheets

(51) Int. Cl.
G06T 5/50 (2006.01)
G06T 7/174 (2017.01)

(56) References Cited

OTHER PUBLICATIONS

Chen, Guanzhou, et al. "Symmetrical dense-shortcut deep fully convolutional networks for semantic segmentation of very-high-resolution remote sensing images." IEEE Journal of Selected Topics in Applied Earth Observations and Remote Sensing 11.5 (2018): 1633-1644. (Year: 2018).*
Long et al. (2015) "Fully Convolutional Networks for Semantic Segmentation" Proceedings of the IEEE Conference on Computer Vision and Pattern Recognition (CVPR), Jun. 7, 2015.

* cited by examiner

IMAGE PROCESSING DEVICE, METHOD, AND PROGRAM

CROSS-REFERENCE TO RELATED APPLICATIONS

This application is a U.S. 371 Application of International Patent Application No. PCT/JP2019/048008, filed on 9 Dec. 2019, which application claims priority to and the benefit of JP Application No. 2018-233709, filed on 13 Dec. 2018, the disclosures of which are hereby incorporated herein by reference in their entireties.

TECHNICAL FIELD

The present invention relates to an image processing device, a method, and a program, and more particularly to an image processing device, a method, and a program for identifying a label of and image.

BACKGROUND ART

In a wide range of fields, there is a need to extract a target area from an image.

For example, there is a method called semantic segmentation in which labels for object classes such as people and automobiles on a per-pixel basis are assigned from an image (see NPL 1).

In the method of semantic segmentation according to NPL 1, an image data set having a correct label is trained by a convolution neural network to generate a trained model. Then, an image to be processed is input into the trained model, and thus it is possible to obtain, as an output, a label image to which object class labels are assigned on a per-pixel basis.

CITATION LIST

Non Patent Literature

[NPL 1] J. Long, E. Shelhamer, and T. Darrel, "Fully convolutional networks for semantic segmentation," in Proc. of IEEE CVPR, 2015.

SUMMARY OF THE INVENTION

Technical Problem

The above method has the following problems.

The accuracy of a label estimated by the trained model depends on the image dataset used for training. Structural information such as the position and size of an object in an image is important for estimating an object class, while a convolutional neural network has the property of not being invariant to geometric deformation called scaling. Therefore, for a high-resolution image being input which is not present in the image data set used for training, the estimation of the object class will fail.

In order to solve the above problems, a training method may be proposed in which the image data set used for training includes an image with a resolution expected as an input. However, this has a problem of costly and not easy constructing and retraining the image data set.

Also, a method may be proposed in which the resolution of an input image is reduced to the resolution of the image data set used for training. However, this has a problem that the original input image is captured at a high resolution, while the resolution of the recognition result is low and the image quality is low accordingly.

The present invention has been made in view of the above circumstances, and an object of the present invention is to provide an image processing device, a method, and a program which are capable of accurately identifying labels even for an image with a resolution not used in training data.

Means for Solving the Problem

In order to achieve the above object, an image processing device according to a first aspect of the invention includes: a downsampling unit that generates, based on an input image, a resolution of the input image, and a resolution of a training image used for training a trained model of assigning labels to pixels of an image, a plurality of low-resolution images from the input image by using a plurality of shift amounts for a pixel correspondence between the input image and the respective low-resolution images with a resolution corresponding to the training image, and outputs the generated low-resolution images and the shift amounts used for generating the low-resolution images; a semantic segmentation processing unit that inputs the low-resolution images to the trained model, and outputs a plurality of low-resolution label images in which labels are respectively assigned to pixels of the respective low-resolution images; and an upsampling unit that outputs, based on the shift amounts used for generating the low-resolution images and the low-resolution label images, a label image in which labels for pixels of the input image are obtained.

Also, in the image processing device according to the first aspect of the invention, the upsampling unit may output the label image by calculating, for each of the low-resolution label images, a separate label image in which a score of the label that is based on an overlapping ratio of the pixel of the low-resolution label image on the pixel of the input image is assigned to each pixel of the input image, based on a result of allocating the low-resolution label image to the input image according to the corresponding shift amount, and by integrating, for each pixel, the scores of the labels assigned to the corresponding pixels of the calculated separate label images to determine a label for the each pixel.

An image processing method according to a second aspect of the invention includes the steps of: by a downsampling unit, generating, based on an input image, a resolution of the input image, and a resolution of a training image used for training a trained model of assigning labels to pixels of an image, a plurality of low-resolution images from the input image by using a plurality of shift amounts for a pixel correspondence between the input image and the respective low-resolution images with a resolution corresponding to the training image, and outputting the generated low-resolution images and the shift amounts used for generating the low-resolution images; by a semantic segmentation processing unit, inputting the low-resolution images to the trained model, and outputting a plurality of low-resolution label images in which labels are respectively assigned to pixels of the respective low-resolution images; and by an upsampling unit, outputting, based on the shift amounts used for generating the low-resolution images and the low-resolution label images, a label image in which labels for pixels of the input image are obtained.

Also, in the image processing method according to the second aspect of the invention, the step performed by the upsampling unit may include outputting the label image by calculating, for each of the low-resolution label images, a separate label image in which a score of the label that is based on an overlapping ratio of the pixel of the low-resolution label image on the pixel of the input image is assigned to each pixel of the input image, based on a result of allocating the low-resolution label image to the input image according to the corresponding shift amount, and by integrating, for each pixel, the scores of the labels assigned to the corresponding pixels of the calculated separate label images to determine a label for the each pixel.

A program according to a third aspect of the invention is a program for causing a computer to function as the units of the image processing device according to the first aspect of the invention.

Effects of the Invention

The image processing device, the method, and the program according to the present invention have an advantageous effect that it is possible to accurately identify labels even for an image with a resolution not used in training data.

DESCRIPTION OF EMBODIMENTS

Hereinafter, an embodiment of the present invention will be described in detail with reference to the drawings.

First, an outline of an embodiment of the present invention will be described.

In order to solve the above problems, in the present invention, for an input of a high-resolution input image not suitable for a trained model, a plurality of low-resolution images whose resolution is reduced to a resolution suitable for the trained model are generated, and each low-resolution image is input to the trained model to output a low-resolution label image.

By assigning labels for low resolution to the high-resolution input image for each low-resolution label image, a label image with the same resolution as the input image can be obtained.

Since any semantic segmentation method can be applied and the trained model can also be used as it is, there is no need to recollect or re-train the training image data set.

Using a semantic segmentation model trained by the method of the embodiment of the present invention makes it possible to estimate the labels of an image with a higher resolution than expected. As a result, it is possible to save time and effort such as re-training the model according to the renewal of a camera used for recognition, and in a scene where inputs of various resolutions are received, it is possible to present a detailed recognition result according to the input resolution.

Figure 1:
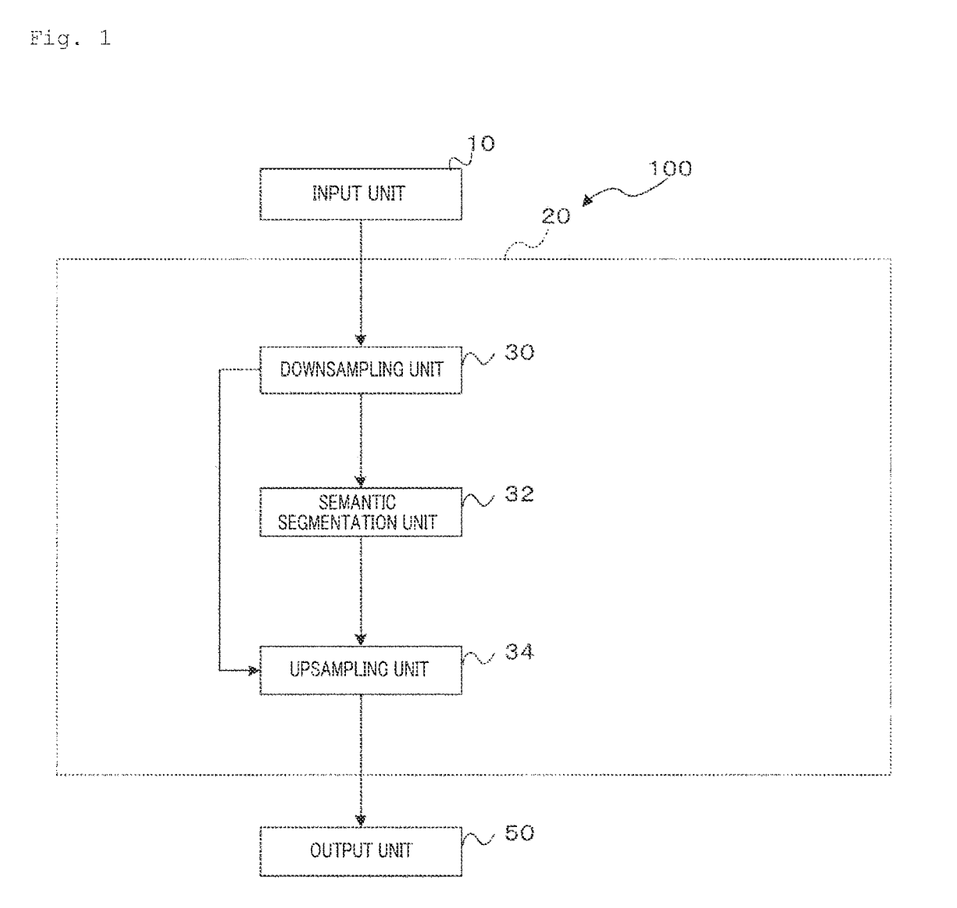
FIG. 1 is a block diagram illustrating a configuration of an image processing device according to an embodiment of the present invention.

Configuration of Image Processing Device
According to Embodiment of Present Invention Next, a configuration of an image processing device according to the embodiment of the present invention will be described. As illustrated in FIG. 1, the image processing device 100 according to the embodiment of the present invention may include a computer that includes a CPU, a RAM, and a ROM storing a program and various data for executing an image processing routine described below. The image processing device 100 functionally includes an input unit 10, a computation unit 20, and an output unit 50 as illustrated in FIG. 1.

The input unit 10 receives, as inputs, an input image to which labels are assigned, the resolution of the input image, and the resolution of a training image used for training a trained model of assigning a label to each pixel of an image.

The computation unit 20 includes a downsampling unit 30, a semantic segmentation unit 32, and an upsampling unit 34. The details of processing of each processing unit will be described below in the description of operations.

The downsampling unit 30 generates, based on the input image, the resolution of the input image, and the resolution of the training image used for training the trained model (not illustrated) of assigning a label to each pixel of an image, which are received by the input unit 10, a plurality of low-resolution images from the input image by using a plurality of shift amounts, respectively. A shift amount indicates a pixel correspondence between the input image and a low-resolution image with a resolution corresponding to the training image. The downsampling unit 30 outputs the generated low-resolution images and the shift amounts used for generating the low-resolution images.

The semantic segmentation unit 32 inputs the low-resolution images into the trained model, and outputs a plurality of low-resolution label images in which labels are respectively assigned to pixels of the respective low-resolution images.

The upsampling unit 34 outputs, based on the shift amounts used for generating the low-resolution images and the low-resolution label images, a label image in which labels for pixels of the input image are obtained to the output unit 50.

Operations of Image Processing Device According
to Embodiment of Present Invention Next, operations of the image processing device 100 according to the embodiment of the present invention will be described. When the input unit 10 receives the input image to which labels are assigned, the resolution of the input image, and the resolution of the training image used for training a trained model of assigning a label to each pixel of an image, the image processing device 100 executes an image processing routine illustrated in FIG. 2.

Figure 2:
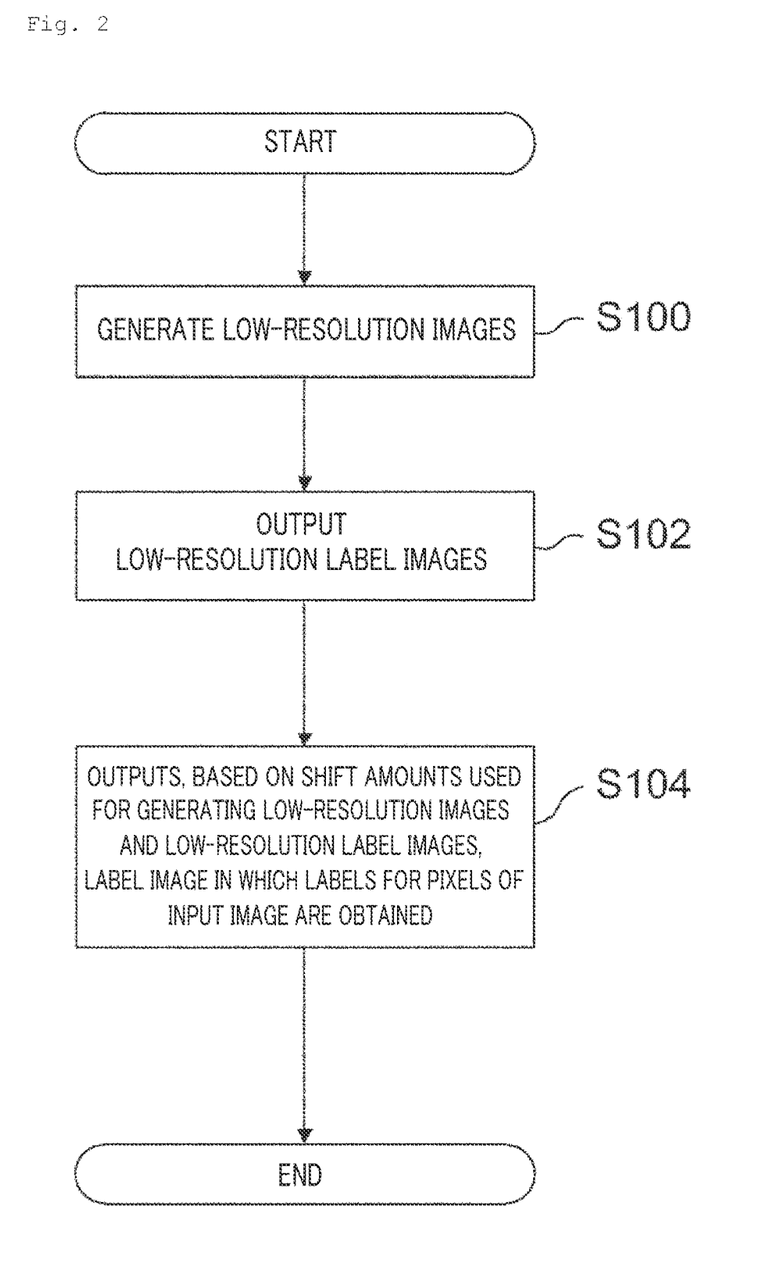
FIG. 2 is a flowchart illustrating an image processing routine in the image processing device according to the embodiment of the present invention.

In step S100, the downsampling unit 30 generates, based on the input image, the resolution of the input image, and the resolution of the training image used for training the trained model (not illustrated) of assigning a label to each pixel of an image, which are received by the input unit 10, a plurality of low-resolution images from the input image by using a plurality of shift amounts, respectively. The downsampling unit 30 outputs the generated low-resolution images and the shift amounts used for generating the low-resolution images.

In step S102, the semantic segmentation unit 32 inputs the low-resolution images into the trained model, and outputs a plurality of low-resolution label images in which labels are assigned to pixels of the respective low-resolution images.

In step S104, the upsampling unit 34 outputs, based on the shift amounts used for generating the low-resolution images and the low-resolution label images, a label image in which labels for pixels of the input image are obtained to the output unit 50.

Figure 3:
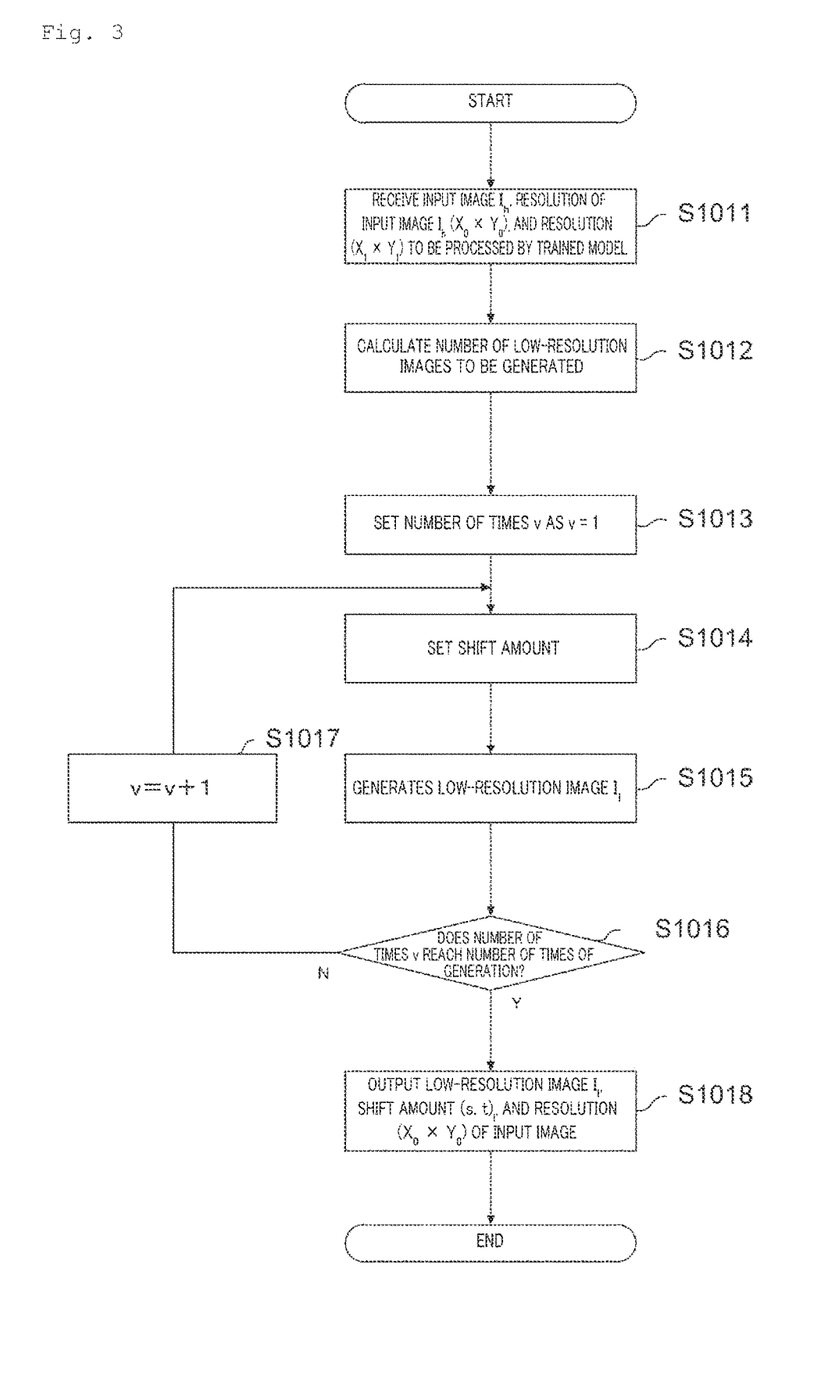
FIG. 3 is a flowchart illustrating details of downsampling processing.

Next, details of the processing of the downsampling unit 30 in step S100 will be described with reference to a flowchart of FIG. 3.

In step S1011, the downsampling unit 30 receives an input image $I_h$, the resolution ($X_0 \times Y_0$) of the input image $I_h$, and a resolution ($X_1 \times Y_1$) to be processed for parameters of the trained model used in step S102. As the resolution to be processed for parameters of the trained model, the image resolution used for a training image of an image database used at the time of training is selected.

In step S1012, the downsampling unit 30 calculates the number of low-resolution images to be generated in downsampling processing from the resolution ($X_0 \times Y_0$) of the input image $I_h$, and the resolution ($X_1 \times Y_1$) to be processed for parameters of the trained model. To restore the amount of information of the input image from the low-resolution image, it is necessary to generate low-resolution images of equal to or more than $$\frac{(X_0 \times Y_0)}{(X_1 \times Y_1)},$$

and accordingly this number is calculated as the number of low-resolution images to be generated.

In step S1013, the downsampling unit 30 sets the number of times v as v=1.

In step S1014, the downsampling unit 30 randomly sets a shift amount $(s, t)_l$ in the sub-pixel order related to the pixel correspondence between the input image and a low-resolution image. Since a pixel value of the low-resolution image changes periodically due to shifting, the range of the shift amount is defined as follows so that a necessary and sufficient shift amount is obtained:

$$\left(-\frac{X_0}{2X_1} < s < \frac{X_0}{2X_1}, -\frac{Y_0}{2Y_1} < t < \frac{Y_0}{2Y_1}\right)$$

In step S1015, the downsampling unit 30 calculates a pixel value $p_l(i, j)$ of a low-resolution image $I_l$ by the following Equations (1) based on the shift amount set in step S1014 and using a result of shifting the input image $I_h$ on a sub-pixel basis, and thus generates the low-resolution image $I_l$. The pixel value $p_l(i, j)$ in an image space $\Omega$ can be represented using pixel values $p_h(m, n)$ of the input image $I_h$, by the following Equations (1).

[Formula 1]

$$p_l(i, j) = \frac{X_1 Y_1}{X_0 Y_0} \sum_{m,n} \int_\Omega h_{mn}(x, y) H_{ij}(x, y) dx dy p_h(m, n) \quad (1)$$

$$h_{mn}(x, y) = \begin{cases} 1\begin{pmatrix} m \le x < m+1 \\ n \le y < n+1 \end{pmatrix}, \\ 0 \text{ else} \end{cases}$$

$$H_{ij}(x, y) = \begin{cases} 1\begin{pmatrix} s + i\frac{X_1}{X_0} \le x < s + (i+1)\frac{X_1}{X_0} \\ t + j\frac{Y_1}{Y_0} \le y < t + (j+1)\frac{Y_1}{Y_0} \end{pmatrix} \\ 0 \text{ else} \end{cases}$$

In step S1016, the downsampling unit 30 determines whether the number of times v reaches the number of times of generation calculated in step S1012. If the number of times v reaches the number of times of generation, the processing the downsampling unit 30 proceeds to step S1018. If the number of times v does not reach the number of times of generation, the downsampling unit 30 counts up v so that v=v+1 in step S1017, and then the processing returns to step S1014 to repeat the corresponding processing.

In step S1018, the downsampling unit 30 outputs the low-resolution image $I_l$ obtained in step S1015, the shift amount $(s, t)_l$ corresponding to the low-resolution image $I_l$, and the resolution ($X_0 \times Y_0$) of the input image.

Figure 5:
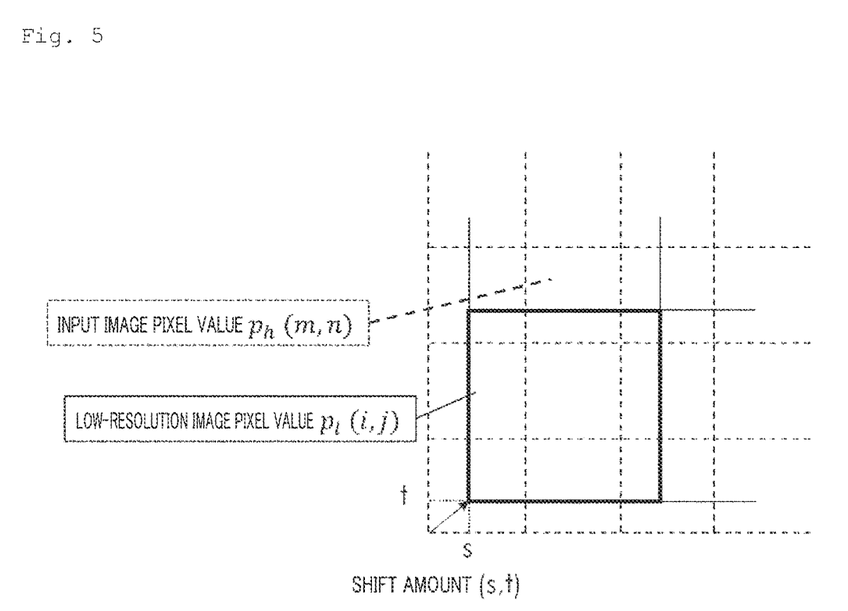
FIG. 5 illustrates an example of the alignment between an input image (high-resolution image) and a low-resolution image.

FIG. 5 illustrates an example of the pixel correspondence between the input image and the low-resolution image in which the input image is shifted by the shift on a sub-pixel basis in step S1015. The thick frame represents a pixel of the low-resolution image, and the dotted frame represents a pixel of the input image.

Figure 4:
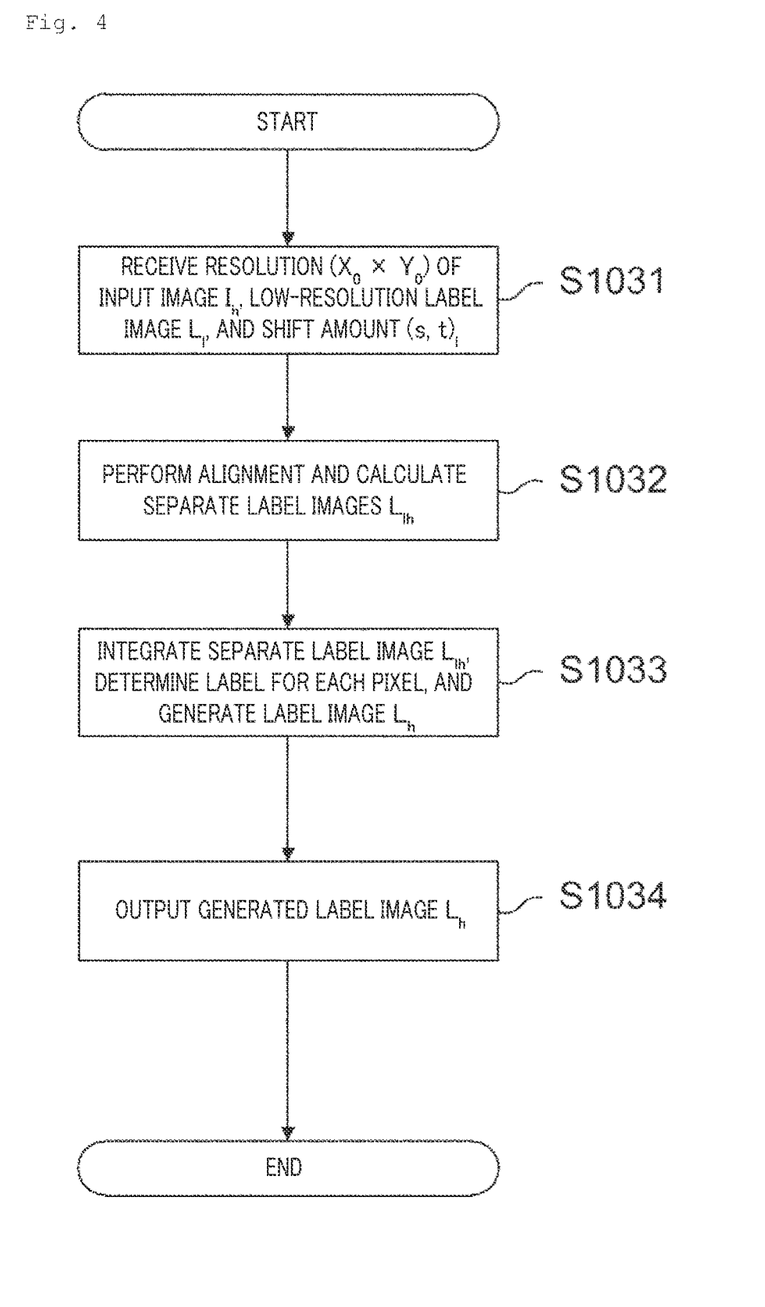
FIG. 4 is a flowchart illustrating details of upsampling processing.

Next, details of the processing of the upsampling unit 34 in step S104 will be described with reference to a flowchart of FIG. 4.

In step S1031, the upsampling unit 34 receives the resolution ($X_0 \times Y_0$) of the input image $I_h$, a plurality of low resolution label images $L_l$, and the shift amounts $(s, t)_l$ corresponding to the plurality of low resolution label images $L_l$.

In step S1032, the upsampling unit 34 uses all the generated low resolution label images $L_l$ and the corresponding shift amounts $(s, t)_l$ to align each low-resolution label image $L_l$ with the input image $I_h$ on a sub-pixel basis, and thus calculates separate label images $L_{lh}$, with the resolution ($X_0 \times Y_0$). To calculate each separate label image $L_{lh}$, the upsampling unit 34 averages, for each pixel of the input image $I_h$, scores of the labels for pixels of the low-resolution label image $L_l$ overlapping with the pixel of the input image $I_h$ as a result of the alignment, with weights that are each based on an overlapping ratio of the corresponding pixel of the low-resolution label image $L_l$ on the pixel of the input image $I_h$, so that the average score is calculated for each label and is assigned to the corresponding pixel of the separate label image $L_{lh}$.

Figure 6:
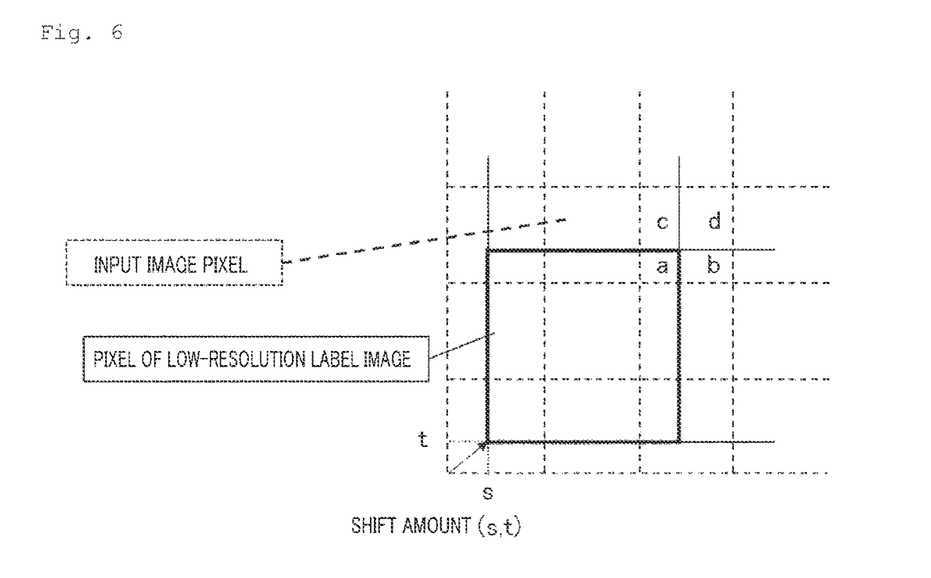
FIG. 6 illustrates an example of the alignment between a low-resolution label image and the input image.

FIG. 6 illustrates an example of the alignment between the low-resolution label image $L_l$ and the input image $I_h$ on a sub-pixel basis in step S1032. The thick frame represents a pixel of the low-resolution label image $L_l$, and the dotted frame represents a pixel of the input image $I_h$. For example, suppose a case where a pixel of the low-resolution label image $L_l$ overlaps with a pixel of interest of the input image $I_h$ and thus regions a, b, c, and d are defined on the pixel of interest. In this case, the overlapping ratio of the pixels is a ratio of the region a to all the regions a, b, c, and d.

In step S1033, the upsampling unit 34 integrates all the separate label images $L_{lh}$, determines the label for each pixel, and generates a label image $L_h$ for the input image $I_h$. The upsampling unit 34 determines, for each pixel of the separate label image $L_{lh}$, that the label with the highest score assigned to the pixel is a label with a high reliability, and adopts it as the label for the pixel. Note that, instead of the reliability based on the score, the label having the highest frequency for the pixel among all the separate label images $L_{lh}$ may be adopted.

In step S1034, the upsampling unit 34 outputs the generated label image $L_h$ to the output unit 50.

As described above, the upsampling unit 34 calculates, for each of the low-resolution label images $L_l$, a separate label image $L_{lh}$ in which a score of the label that is based on an overlapping ratio of the pixel of the low-resolution label image is assigned to each pixel of the input image $I_h$ on the pixel of the input image $I_h$, based on a result of allocating the low-resolution label image $L_l$ to the input image $I_h$ according to the corresponding shift amount $(s, t)_l$. Then, the upsampling unit 34 outputs the label image $L_h$ by integrating, for each pixel, the scores of the labels assigned to the corresponding pixels of the calculated separate label images $L_{lh}$ to determine a label for that pixel.

As described above, according to the image processing device according to the embodiment of the present invention, it is possible to accurately identify labels even for an image with a resolution not used in training data.

In this way, in order to estimate the labels for an input image with a resolution higher than the resolution expected by a trained semantic segmentation model, the resolution of the input image is reduced and the estimated label image is made higher resolution, so that a fine recognition result is presented.

Note that the present invention is not limited to the above-described embodiment, and various modifications and applications are possible without departing from the scope and spirit of the present invention.

REFERENCE SIGNS LIST

10 Input unit
20 Computation unit
30 Downsampling unit
32 Semantic segmentation unit
34 Upsampling unit
50 Output unit
100 Image processing device

The invention claimed is:

1. An image processing device comprising:
a downsampler configured to generate, based on an input image, a resolution of the input image, and a resolution of a training image used for training a trained model of assigning labels to pixels of an image, a plurality of low-resolution images from the input image by using a plurality of shift amounts for a pixel correspondence between the input image and the respective low-resolution images with a resolution corresponding to the training image, and
output the generated low-resolution images and the shift amounts used for generating the low-resolution images;
a semantic segmentation processor configured to input the low-resolution images to the trained model, and output a plurality of low-resolution label images in which labels are respectively assigned to pixels of the respective low-resolution images; and
an upsampler configured to output, based on the shift amounts used for generating the low-resolution images and the low-resolution label images, a label image in which labels for pixels of the input image are obtained, wherein the upsampler outputs the label image:
by calculating, for each of the low-resolution label images, a separate label image in which a score of the label that is based on an overlapping ratio of the pixel of the low-resolution label image on the pixel of the input image is assigned to each pixel of the input image, based on a result of allocating the low-resolution label image to the input image according to the corresponding shift amount, and
by integrating, for each pixel, the scores of the labels assigned to the corresponding pixels of the calculated separate label images to determine a label for the each pixel.

2. The image processing device according to claim 1, wherein the resolution of the input image is higher than the resolution of the training image.

3. The image processing device according to claim 1, wherein at least one of the plurality of low-resolution label images includes a label associated with a pixel in the at least one of the plurality of low-resolution label images.

4. The image processing device according to claim 1, wherein the resolution of the input image is higher than the resolution of the training image.

5. The image processing device according to claim 1, wherein at least one of the plurality of low-resolution label images includes a label associated with a pixel in the at least one of the plurality of low-resolution label images.

6. An image processing method, the method comprising:
generating, by a downsampler, based on an input image, a resolution of the input image, and a resolution of a training image used for training a trained model of assigning labels to pixels of an image, a plurality of low-resolution images from the input image by using a plurality of shift amounts for a pixel correspondence between the input image and the respective low-resolution images with a resolution corresponding to the training image, and outputting the generated low-resolution images and the shift amounts used for generating the low-resolution images;
receiving, by a semantic segmentation processor, the low-resolution images to the trained model;
outputting, by the semantic segmentation processor, a plurality of low-resolution label images in which labels are respectively assigned to pixels of the respective low-resolution images; and
outputting, by an upsampler, based on the shift amounts used for generating the low-resolution images and the low-resolution label images, a label image in which labels for pixels of the input image are obtained, wherein the upsampler outputs the label image:
by calculating, for each of the low-resolution label images, a separate label image in which a score of the label that is based on an overlapping ratio of the pixel of the low-resolution label image on the pixel of the input image is assigned to each pixel of the input image, based on a result of allocating the low-resolution label image to the input image according to the corresponding shift amount, and by integrating, for each pixel, the scores of the labels assigned to the corresponding pixels of the calculated separate label images to determine a label for the each pixel.

7. The image processing method according to claim 6, wherein the resolution of the input image is higher than the resolution of the training image.

8. The image processing method according to claim 6, wherein at least one of the plurality of low-resolution label images includes a label associated with a pixel in the at least one of the plurality of low-resolution label images.

9. The image processing method according to claim 6, wherein the resolution of the input image is higher than the resolution of the training image.

10. The image processing method according to claim 6, wherein at least one of the plurality of low-resolution label images includes a label associated with a pixel in the at least one of the plurality of low-resolution label images.

11. A computer-readable non-transitory recording medium storing a computer-executable program instructions that when executed by a processor cause a computer system to:
  generate, by a downsampler, based on an input image, a resolution of the input image, and a resolution of a training image used for training a trained model of assigning labels to pixels of an image, a plurality of low-resolution images from the input image by using a plurality of shift amounts for a pixel correspondence between the input image and the respective low-resolution images with a resolution corresponding to the training image, and outputting the generated low-resolution images and the shift amounts used for generating the low-resolution images;
  receive, by a semantic segmentation processor, the low-resolution images to the trained model;
  output, by the semantic segmentation processor, a plurality of low-resolution label images in which labels are respectively assigned to pixels of the respective low-resolution images; and
  output, by an upsampler, based on the shift amounts used for generating the low-resolution images and the low-resolution label images, a label image in which labels for pixels of the input image are obtained,
  wherein the upsampler outputs the label image:
    by calculating, for each of the low-resolution label images, a separate label image in which a score of the label that is based on an overlapping ratio of the pixel of the low-resolution label image on the pixel of the input image is assigned to each pixel of the input image, based on a result of allocating the low-resolution label image to the input image according to the corresponding shift amount, and
    by integrating, for each pixel, the scores of the labels assigned to the corresponding pixels of the calculated separate label images to determine a label for the each pixel.

12. The computer-readable non-transitory recording medium according to claim 11, wherein the resolution of the input image is higher than the resolution of the training image.

13. The computer-readable non-transitory recording medium according to claim 11, wherein at least one of the plurality of low-resolution label images includes a label associated with a pixel in the at least one of the plurality of low-resolution label images.

14. The computer-readable non-transitory recording medium according to claim 11, wherein the resolution of the input image is higher than the resolution of the training image.

15. The computer-readable non-transitory recording medium according to claim 11, wherein at least one of the plurality of low-resolution label images includes a label associated with a pixel in the at least one of the plurality of low-resolution label images.

* * * * *